United States Patent [19]

Larsson et al.

[11] Patent Number: 5,745,905
[45] Date of Patent: Apr. 28, 1998

[54] METHOD FOR OPTIMIZING SPACE IN A MEMORY HAVING BACKUP AND DATABASE AREAS

[75] Inventors: Bo Erik Stefan Larsson, Huddinge; Iván Maria Sanchez, Stockholm, both of Sweden

[73] Assignee: Telefonaktiebolaget LM Ericsson, Stockholm, Sweden

[21] Appl. No.: 162,774

[22] Filed: Dec. 8, 1993

[30] Foreign Application Priority Data

Dec. 8, 1992 [SE] Sweden ................... 9203692

[51] Int. Cl.$^6$ ............................... G06F 17/30
[52] U.S. Cl. ............................... 707/203
[58] Field of Search ................... 395/610, 425, 395/575; 707/8, 203, 201, 200, 204, 1

[56] References Cited

U.S. PATENT DOCUMENTS

| | | | |
|---|---|---|---|
| 4,627,019 | 12/1986 | Ng | 707/8 |
| 4,635,189 | 1/1987 | Kendall | 707/10 |
| 4,686,620 | 8/1987 | Ng | 395/600 |
| 4,819,156 | 4/1989 | DeLorme et al. | 395/600 |
| 4,974,197 | 11/1990 | Blount et al. | 395/200.64 |
| 4,987,533 | 1/1991 | Clark et al. | 395/600 |
| 5,043,871 | 8/1991 | Nishigaki et al. | 395/600 |
| 5,086,502 | 2/1992 | Malcolm | 395/182.06 |
| 5,089,958 | 2/1992 | Horton et al. | 395/575 |
| 5,129,082 | 7/1992 | Tirfling et al. | 395/600 |
| 5,133,065 | 7/1992 | Cheffetz et al. | 395/575 |
| 5,201,044 | 4/1993 | Frey, Jr. et al. | 395/575 |
| 5,202,982 | 4/1993 | Gramlich et al. | 395/600 |
| 5,276,860 | 1/1994 | Fortier et al. | 395/575 |
| 5,276,867 | 1/1994 | Kenley et al. | 395/600 |
| 5,301,286 | 4/1994 | Rajani | 395/400 |
| 5,313,631 | 5/1994 | Kao | 707/204 |
| 5,317,728 | 5/1994 | Tevis et al. | 395/600 |
| 5,317,731 | 5/1994 | Dias et al. | 707/8 |
| 5,347,653 | 9/1994 | Flynn et al. | 395/600 |
| 5,379,398 | 1/1995 | Cohn et al. | 395/425 |
| 5,379,412 | 1/1995 | Eastridge et al. | 395/575 |
| 5,403,639 | 4/1995 | Belsan et al. | 395/600 |
| 5,465,350 | 11/1995 | Fueki | 707/204 |

FOREIGN PATENT DOCUMENTS

| | | |
|---|---|---|
| 444 544 | 9/1991 | European Pat. Off. . |
| WO84/00426 | 2/1984 | WIPO . |

OTHER PUBLICATIONS

H. Cheng & J. Sheu "Design and Implementation of a Distributed File System" Software–Practice and Experience vol. 21(7), pp. 657–675, Jul. 1991.

D. P. Kinard et al. "Data Move Optimization in Mass Storage Systems" IBM Tech. Disc. Bull., vol. 21(6), pp. 2247–2249, Nov. 1978.

C. M. May "Management Technique for Memory Hierarchies" IBM Tech. Disc. Bull., vol. 24(1A), pp. 333–335, Jun. 1981.

S. Quinlan, "A Cached Worm File System" Software–Practice and Experience, vol. 21(12), pp. 1289–1299, Dec. 1991.

*Primary Examiner*—Thomas G. Black
*Assistant Examiner*—Jack M. Choules
*Attorney, Agent, or Firm*—Burns, Doane, Swecker & Mathis, L.L.P.

[57] ABSTRACT

When storing backup data in a primary memory, memory space is optimized by selectively storing objects in storage locations in the primary memory. Only objects which have not been updated since the latest backup are stored in a backup area of the primary memory, and only updated objects are stored in a data-base area. The data base accesses objects in the backup area. The backup area may be write-protected.

14 Claims, 2 Drawing Sheets

METHOD FOR OPTIMIZING SPACE IN A MEMORY HAVING BACKUP AND DATABASE AREAS

BACKGROUND

The present invention relates to a method for storing backup data in a primary memory.

This application claims priority from Swedish Patent Application No. 9203692-0 filed Dec. 8, 1992, which is expressly incorporated here by reference.

Primary memory backup involves freezing all data in a data base at a given time point and when all objects are in a consistent state. Such backup can be effected in many different ways, depending on availability requirements and error tolerance properties. If the data base is composed of an error tolerant computer equipped with a duplicated memory, a backup and log can be stored in the primary memory of one and the same computer. If the computer is not error tolerant and must therefore be switched-off in the event of error, backup and log can be stored in two redundant computers.

A data base normally has a recovery function which is responsible for the data stored in the data base being consistent, i.e., exhibits a state which is to be expected with regard to different updatings.

In order to be able to recover from errors that write-corrupt the data base, it is necessary to store a backup version. A backup contains all information that is required to be able to recreate the data base to the same consistent state that prevailed at the time of creating the backup version. Recreation of the data base to the relevant state requires information from the log.

A typical strategy for recovering a data base can be summarized as follows.

If the data base has become inconsistent as a result of the occurrence of a catastrophic error, the recovery function orders a restart by reloading the latest backup version. In order to enable a return to be made to a more relevant state, the data base is then updated with the information stored in the log, i.e., a history of earlier operations stored in a memory. The log is used by the recovery function to repeat latest accepted transactions, i.e., processing of objects in the data base.

The term object is intended here to have the meaning conventional within data processing technology. Very briefly, an object is an information packet with an associated description of how its information shall be managed. The objects are divided into classes according to their area of use and are identified by object identities. For a more detailed description of the term object and the manner in which it is used, reference is made, for instance, to "OBJECT-ORIENTED ANALYSIS" by Peter Coad and Edward Yourdon, Yourdon Press Computing Series.

When updating an object, a copy of the original object is created and a lock is introduced in order to prevent other users from updating the data base. The updated copy is not switched-in and the set locks are not released until commitment is performed, by which is meant the transaction operation used by a program or operator to indicate that a current transaction has been finalized and that its effects shall remain.

Copy objects or objects that shall not be subjected to backup are removed when restarting the data base with reloading.

High requirements on availability can be satisfied by storing the latest version of the backup and log in a primary memory of a computer. A backup archive is used to store older backup versions.

As a result of the rapid development in memory technology, it is now possible to acquire large primary memory data bases at a reasonable cost. When the need to store large quantities of data in a data base occurs, however, it is nevertheless important to save on memory space. Backups and logs which lie in the same computer as the data base may at least triple the memory requirement, for instance.

Known primary memory backup solutions are generally based on the concept that all objects in the data base shall be found both in the data base area and in the backup area. This also applies to those objects which have not been changed between the backup occasions.

It is known from International Patent Publication WO 84/00426 to store different relation versions in different data base locations. It is conceivable to define the different relations as different objects. There are also access blocks which define the data base locations and point thereto. When updating, a new access block is used to store a new relation version (object) in a new data base location. Thus, although an access structure is used in backup, this does not involve collected reloading of the data base with the use of the entire access structure copied from a backup area to the data base area for updating the data base area with those changes stored in a log.

Updating or recovery of data is also known from European Patent Publication EP 444,544. In this case, pointers are used to point-out different data domains. The pointers are used when updating. Thus, the publication is concerned with the use of an access structure for transferring indicated objects for updating, but is not concerned with the transfer of the access structure from a backup area to a data base area for updating the data base area with changes that are stored in a log.

SUMMARY

An object of the present invention is to provide a method of the kind defined in the introduction with which use of a primary memory in the data base is optimized.

This is achieved in accordance with the present invention by storing the same versions of objects solely in one location in the primary memory, by storing in a backup area of the primary memory only objects which have not been updated since the latest backup, and storing only updated objects in a database area. Only the access structure is copied from the backup area to the data-base area when reloading the data base, and the data base accesses objects in the backup area.

BRIEF DESCRIPTION OF THE DRAWINGS

The invention will now be described in more detail with reference to the drawings, in which.

DETAILED DESCRIPTION

Figure 1:
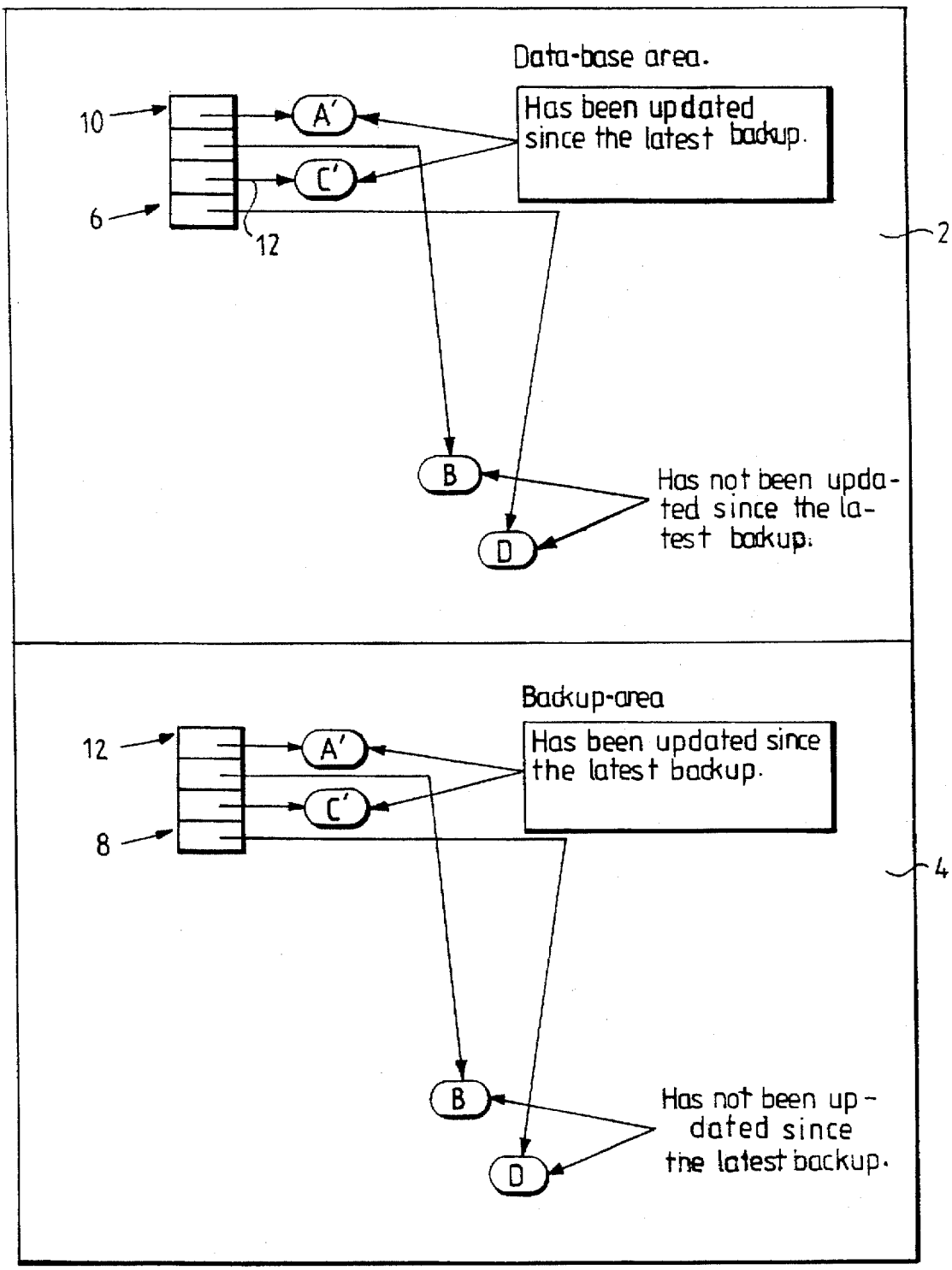
FIG. 1 illustrates schematically a known solution for primary memory backup.

FIG. 1, which is intended to show a known solution, is divided into two sections 2 and 4 which represent schematically a data-base area and a backup area, respectively, in the primary memory of a computer. Associated with each area there is a respective catalogue 6 and 8 which contains a list of objects with associated class and key. By means of a pointer 10 and 12, respectively, and with knowledge of an associated class and key, objects to be subjected to an operation are chosen. Each catalogue is shown to include four objects A, B, C, D by way of example. Those objects which have been updated since the latest backup have been identified in the Figure with prime signs. The objects A and C have been updated to A' and C' since the latest backup. The objects B and D have not been updated.

FIG. 1 illustrates the characteristic feature of the known solution, namely that the data-base area 2 and the backup area 4 together contain duplicated copies of all objects, even those objects that have not been changed between two backup occasions.

Figure 2:
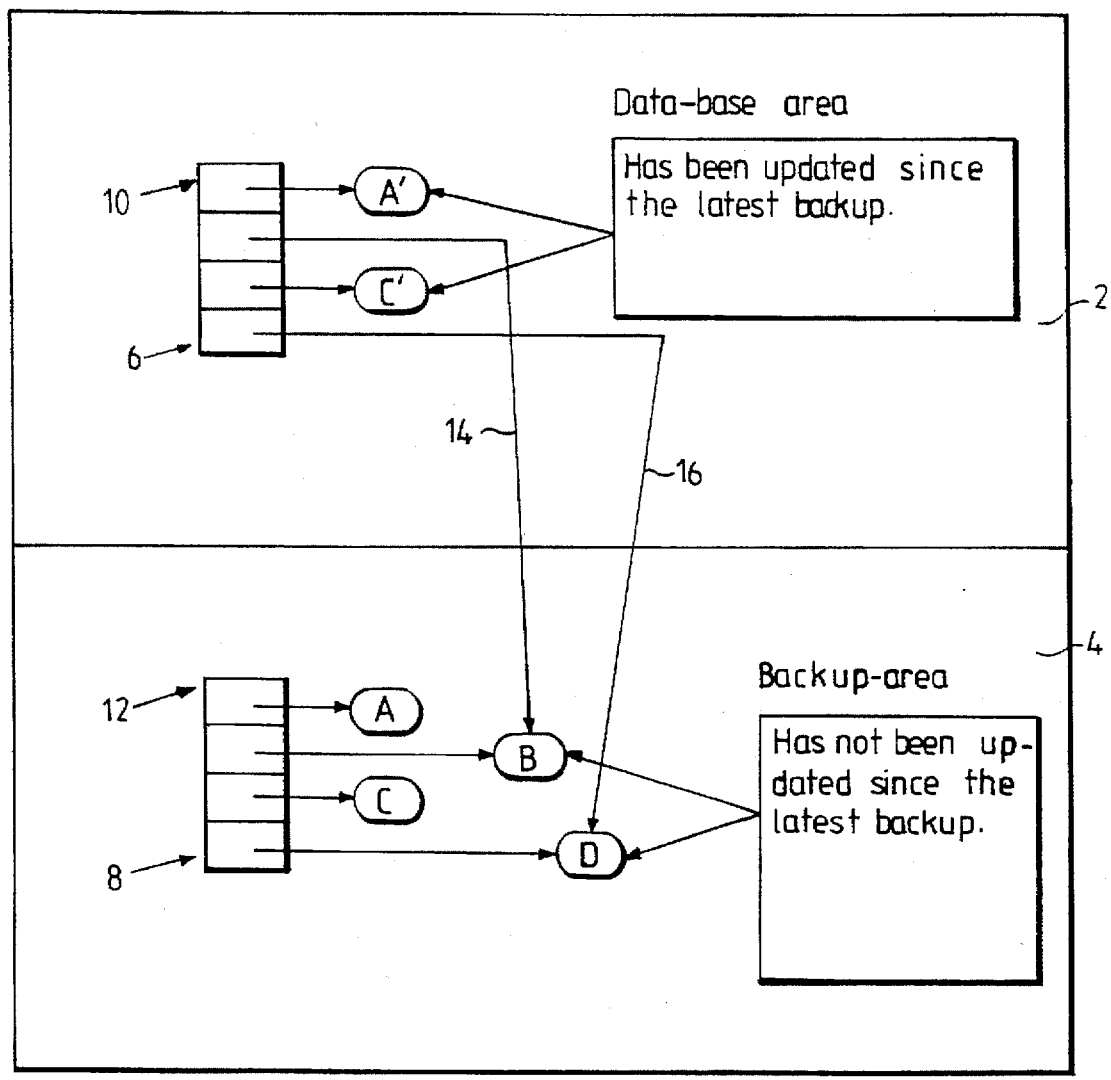
FIG. 2 illustrates schematically in a manner similar to FIG. 1 the principle of Applicants' invention.

Those elements in FIG. 2 that find correspondence in FIG. 1 have been identified by the same reference signs. The Figure illustrates the features characteristic of the present invention, namely that the same versions of objects are stored solely in one location in the primary memory and that the data-base area accesses objects in the backup area. Different versions of objects are thus stored in different locations in the primary memory. In the case of a preferred embodiment, only those objects which have been updated since the latest backup are stored in the data-base area 2, whereas only non-updated objects are stored in the backup area 4. The data base is changed to point-out those objects in the backup area 4 that are write-protected, but it permits readout of data.

More specifically, only the updated objects A' and C' are stored in the data-base area 2, whereas the objects A, B, C and D are stored in the backup area 4, and the data base is changed to point-out the objects B and D in the backup area 4, as indicated by arrows 14 and 16 respectively.

The invention affords a number of important advantages.

Because only objects that have been changed since the time of backup are stored in the data-base area, a saving in memory space is gained which, in turn, results in lower computer manufacturing costs.

When reloading, a performance gain is obtained without the backup being lost as a result of all changed objects being stored in the data-base area. The objects are erased in the data-base areas and only the access structure is copied from the backup area to the data-base area and the log is read.

It will be appreciated that write-protection of backup is possible.

Applicants' invention has been described above in terms of specific embodiments. It will be readily appreciated by one of ordinary skill in the art, however, that their invention is not limited to those embodiments and that the principles of the invention may be embodied and practiced in other devices and methods. Therefore, the invention should not be regarded as delimited by those specific embodiments but by the following claims.

What is claimed is:

1. A method for storing backup data for a data base in a primary memory having a backup area and a database area comprising the steps of:

storing in the backup area only objects which have not been updated since a latest backup;

storing only updated objects in the data-base area;

copying only an access structure from the backup area to the data-base area when reloading the data base; and accessing objects in the backup area.

2. The method of claim 1, wherein the backup area is write-protected.

3. The method of claim 1, further comprising the step of updating the data-base area with object changes stored in a log.

4. The method of claim 1, wherein the backup area includes a first catalog and the database area includes a second catalog and the step of copying further comprises copying only from the first catalog to the second catalog when reloading the database.

5. The method of claim 4, wherein the backup area is write protected.

6. The method of claim 1, wherein the database has a first access structure and the backup area has a second access structure, further comprising the steps of:

indicating with the first access structure the location in the database area of all objects that have been updated since the latest backup and indicating the location in the backup area of other objects that have not been updated since the latest backup; and indicating with the second access structure only the location of all objects in the backup area.

7. A method for storing objects in a database in a primary memory including a backup area with a first access structure and a database area with a second access structure comprising the steps of:

storing in the backup area only objects which have not been updated since a latest backup;

storing in the database area only objects which have been updated since a latest backup;

copying only the first access structure from the backup area to the second access structure in the database area when reloading the database; and accessing objects in the backup area.

8. The method of claim 7, wherein the backup area is write-protected.

9. The method of claim 8, further comprising the step of updating the database area with object changes in a log.

10. The method of claim 7 further comprising the steps of:

indicating with the second access structure the location in the database area the location of all objects that have been updated since the latest backup and indicating the location in the backup area of other objects that have not been updated since the latest backup; and indicating with the first access structure only the location of all objects in the backup area.

11. A system for storing objects comprising:

a primary memory including a backup area and database area;

a first access structure located in the backup area for indicating the location of objects which have not been updated since a latest backup;

a second access structure located in the database area for indicating the location of objects which have been updated and have not been updated;

means for storing objects which have not been updated since a latest backup in the backup area;

means for storing objects which have been updated in the database area;

means for copying the first access structure to the second access structure when reloading the system; and means for accessing objects.

12. The system of claim 11, wherein the backup area is write-protected.

13. The system of claim 12, further comprising means for updating the database area with object changes from a log.

14. A method of optimizing memory space when storing backup in a primary memory having a backup area with an access structure and a database area, comprising the steps of:

storing a version of an object solely in one location in the primary memory by storing objects non-updated since a latest backup solely in the backup area;

storing updated objects solely in the database area; and copying only the access structure from the backup area to the database area when reloading the database to access the non-updated objects in the backup area.

* * * * *